(12) United States Patent
Zhou et al.

(10) Patent No.: US 12,572,502 B2
(45) Date of Patent: Mar. 10, 2026

(54) LOAD-AWARE DIRECTORY MIGRATION METHOD AND SYSTEM IN DISTRIBUTED FILE SYSTEM

(71) Applicant: Huazhong University of Science And Technology, Wuhan (CN)

(72) Inventors: Ke Zhou, Wuhan (CN); Chunhua Li, Wuhan (CN); Yuanzhang Wang, Wuhan (CN); Peng Zhang, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 0 days.

(21) Appl. No.: 18/812,974

(22) Filed: Aug. 22, 2024

(65) Prior Publication Data

US 2025/0335394 A1    Oct. 30, 2025

(30) Foreign Application Priority Data

Apr. 29, 2024    (CN) .......................... 202410524935.3

(51) Int. Cl.
G06F 16/11        (2019.01)
G06F 16/182        (2019.01)
(52) U.S. Cl.
CPC .......... G06F 16/119 (2019.01); G06F 16/182 (2019.01)
(58) Field of Classification Search
CPC .............................. G06F 16/119; G06F 16/182
See application file for complete search history.

(56) References Cited

U.S. PATENT DOCUMENTS

| | | | | |
|---|---|---|---|---|
| 8,180,983 B1 * | 5/2012 | Jernigan | ................. | G06F 3/067 |
| | | | | 707/827 |
| 10,754,696 B1 * | 8/2020 | Chinnam | .............. | G06F 16/162 |
| 2010/0238945 A1 * | 9/2010 | McKernan | .......... | H04L 12/4641 |
| | | | | 370/401 |
| 2011/0179176 A1 * | 7/2011 | Ravichandran | ........ | G06Q 10/06 |
| | | | | 709/226 |
| 2020/0220928 A1 * | 7/2020 | Karande | ............... | G06F 16/185 |
| 2023/0017966 A1 * | 1/2023 | Skoff | .................... | G06F 16/285 |
| 2024/0176761 A1 * | 5/2024 | Fan | ........................ | G06F 16/119 |
| 2025/0245204 A1 * | 7/2025 | Nagarajan | ............. | G06F 16/185 |

\* cited by examiner

*Primary Examiner* — Kavita Stanley
*Assistant Examiner* — Jedidiah P Ferrer
(74) *Attorney, Agent, or Firm* — MATTHIAS SCHOLL P.C.; Matthias Scholl

(57)        ABSTRACT

A load-aware directory migration method in a distributed file system (DFS), including: 1) receiving a plurality of directory requests created by DFS clients, parsing each of the plurality of directory requests, to obtain directory request information corresponding to the plurality of directory requests; 2) inputting all of the directory request information corresponding to the plurality of directory requests obtained in 1) into a pre-trained machine learning model, to obtain directory labels corresponding to all directory requests; 3) obtaining a label corresponding to a maximum score interval from the directory labels corresponding to all directory requests obtained in 2), and obtaining all directories in the directory request information corresponding to the label; 4) building a directory migration queue based on all the directories obtained in 3); and 5) migrating all the directories in the directory migration queue obtained in 4) through particle swarm optimization (PSO), to obtain a final migration result.

6 Claims, 4 Drawing Sheets

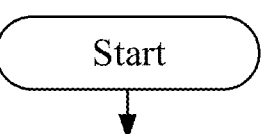

Start

1) Receiving a plurality of directory requests created by DFS clients, parsing each of the plurality of directory requests, to obtain directory request information corresponding to the plurality of directory requests;

2) Inputting all directory request information corresponding to the plurality of directory requests obtained in 1) into a pre-trained machine learning model, to obtain directory labels corresponding to all directory requests;

3) Obtaining a label corresponding to a maximum score interval from the directory labels corresponding to all directory requests obtained in 2), and obtaining all directories in the directory request information corresponding to the label;

4) Building a directory migration queue based on all the directories obtained in 3); and 5) Migrating all the directories in the directory migration queue obtained in 4) through particle swarm optimization (PSO), to obtain a final migration result.

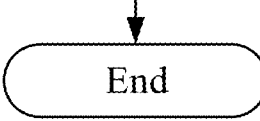

End

FIG. 2

LOAD-AWARE DIRECTORY MIGRATION METHOD AND SYSTEM IN DISTRIBUTED FILE SYSTEM

CROSS-REFERENCE TO RELATED APPLICATIONS

Pursuant to 35 U.S.C. § 119 and the Paris Convention Treaty, this application claims foreign priority to Chinese Patent Application No. 202410524935.3 filed Apr. 29, 2024. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the field of distributed storage systems, and more particularly, to a load-aware directory migration method and system in a distributed file system (DFS).

Conventional distributed file systems employ designed balancing algorithms to facilitate data distribution. However, DFS cannot avoid encountering skewed real-world workloads. With the operation of the workload, the data distribution within the distributed cluster is gradually out of balance. If DFS clumsily fails to trigger a data migration operation in time, it can cause dramatic performance degradation.

Typical file-level migration methods can usually be summarized into the following three categories. First, the most common data rebalancing mechanism in DFS is to greedily migrate data to the freest node, based on capacity once the node reaches a single threshold. Second, file life cycle based methods pick files based on the sequence of file creation time. Third, the dynamic file hotness based approach develops a migration policy with multiple thresholds, which aims to keep the disk usage as close to the average usage as possible.

However, there are some limitations in file-level migration methods. First, fine-grained file-level redistribution generates a high performance tax because it comes with the additional cost of more pointers. Second, file-level hotness disappears too quickly. The literature suggests that frequent migrations do not alleviate load imbalance and cause ping-pong effects. Third, the above three methods cannot fully identify hotspot data, which leads to low migration efficiency.

SUMMARY

To solve the above-mentioned shortcomings, the disclosure provides a load-aware directory migration method and system in a distributed file system, aiming to solve the technical problem that conventional file-level data migration methods introduce too many pointers during the migration process, leading to additional overhead. In addition, during the migration process, the hotness of the files disappears quickly, leading to ineffective migration during frequent file-level migration operations, as well as the inability to fully discover hot data, resulting in low migration efficiency.

The disclosure provides a load-aware directory migration method in a distributed file system (DFS), the method comprising:

1) receiving a plurality of directory requests created by DFS clients, parsing each of the plurality of directory requests, to obtain directory request information corresponding to the plurality of directory requests;
2) inputting all of the directory request information corresponding to the plurality of directory requests obtained in 1) into a pre-trained machine learning model, to obtain directory labels corresponding to all directory requests;
3) obtaining a label corresponding to a maximum score interval from the directory labels corresponding to all directory requests obtained in 2), and obtaining all directories in the directory request information corresponding to the label;
4) building a directory migration queue based on all the directories obtained in 3); and
5) migrating all the directories in the directory migration queue obtained in 4) through particle swarm optimization (PSO).

In a class of this embodiment, in 1), parsing each of the plurality of directory requests to obtain directory request information corresponding to the plurality of directory requests comprises: obtaining a first historical information dataset comprising I/O history records during DFS runtime based on the directory requests, preprocessing the first historical information dataset to remove features unrelated to the directory requests, to obtain a second historical information dataset that only contains features related to the directory requests; and parsing the second historical information dataset, to obtain the directory request information corresponding to the plurality of directory requests.

In a class of this embodiment, the machine learning model is a lightweight gradient boosting machine (LightGBM) model.

In a class of this embodiment, the machine learning model is trained through the following steps:

2.1) collecting historical directory data for all storage nodes in DFS;
2.2) for the historical directory data of each storage node in DFS collected in 2.1), obtaining the directory request information corresponding to each directory;
2.3) for the historical directory data of each storage node in DFS collected in 2.1), processing the historical directory data to obtain directory status information corresponding to each directory;
2.4) for the historical directory data of each storage node in DFS collected in 2.1), normalizing the directory request information corresponding to all directories obtained in 2.2) to obtain normalized directory request information corresponding to each storage node; dividing the directory request information corresponding to all storage nodes and normalized directories into a training set and a testing set in a ratio of 6:4;
2.5) for each directory request information in the training set obtained in 2.4), calculating a directory hotness score corresponding to the directory request information;
2.6) obtaining minimum and maximum values of the directory hotness score corresponding to the directory request information in the training set obtained in 2.5), and dividing all directory hotness scores into K score intervals based on the maximum and minimum values, with each score interval corresponding to a label;
2.7) inputting K labels obtained in 2.6) and the directory request information corresponding to each directory in the historical directory data of each storage node in DFS obtained in 2.2) into the machine learning model for classification training, to obtain a preliminarily trained machine learning model; and 2.8) testing the preliminarily trained machine learning model obtained in 2.7) with the testing set obtained in 2.4), to obtain a trained machine learning model.

In a class of this embodiment, the historical directory data of an i-th storage node in DFS comprises a current value $R_c$ (i, r) of a resource dimension r at a current time of the i-th storage node in DFS and a maximum value $R_t$ (i, r) of the resource dimension r of the i-th storage node in DFS, where r represents one of two resource dimensions of input/output operations per second (IOPS) and bandwidth, i represents the i-th storage node in DFS, and $i \in (1,$ a total number of storage nodes in DFS is m), $\upsilon$ represents an average resource utilization of all storage nodes in DFS, and $$\upsilon = \frac{1}{m}\sum_{i=1}^{m} \frac{R_c(i, r)}{R_t(i, r)};$$

in 2.3), an average IOPS and average bandwidth of each directory in the historical directory data of each storage node in DFS collected in 2.1) are calculated in sequence and used as the directory request information corresponding to the directory.

In a class of this embodiment, in 2.5), the directory hotness score corresponding to the directory request information is calculated as follows:

$$HotnessScore = \lambda \times F + \frac{1-\lambda}{\Delta T}, \lambda \in [0, 1];$$

$\lambda$ refers to a learned factor; F refers to access frequency to the directory, and $\Delta T$ refers to a mean value of the time intervals between every two access in a time window.

In 2.6), K is from 0 to 4, and each directory request information in the training set corresponds to K labels based on the score interval of the corresponding directory hotness score.

In a class of this embodiment, in 4), building a directory migration queue based on all the directories comprises:

4.1) initializing a total capacity of directories included in the directory migration queue: Capacity=0;

4.2) determining whether the total capacity of the directory included in the directory migration queue is greater than or equal to a predetermined proportion of a storage node capacity in DFS; if so, ending step of 4.2), otherwise, proceeding to 4.3);

4.3) obtaining a current balance of DFS and determining if the current balance is greater than or equal to a preset threshold; if so, ending step of 4.3), otherwise, proceeding to 4.4);

4.4) adding all the directories obtained in 3) to the directory migration queue which is initially empty to obtain an updated directory migration queue;

4.5) performing statistical analysis on the updated directory migration queue in 4.4) to obtain status information of each directory in peer directories in the updated directory migration queue;

4.6) for each directory in the updated directory migration queue obtained in 4.4), obtaining an optimal adjustment factor $\alpha$ of the directory based on the status information of the directory in the peer directories in the updated directory migration queue obtained in 4.5);

4.7) for each directory in the updated directory migration queue obtained in 4.4), selecting $\alpha$ peer directories of the directory based on the optimal adjustment factor $\alpha$ of the directory obtained in 4.6), and determining if there is a correlation between the $\alpha$ peer directories; if so, proceeding directly to 4.8), otherwise setting $\alpha$=0 and proceeding to 4.8);

4.8) for each directory in the updated directory migration queue obtained in 4.4), packaging the $\alpha$ peer directories of the directory into one object, and placing the object in the updated directory migration queue obtained in 4.4), to obtain a final directory migration queue; and 4.9) calculating a current capacity CapacityDirj of the j-th directory in the final directory migration queue, where $j \in (1,$ a total number of directories in the final directory migration queue is num), setting a total capacity contained in the final directory migration queue to Capacity=Capacity+Capacity_Dir$_1$+Capacity_Dir$_2$+ . . . +Capacity Dir$_{num}$, and returning to 4.2).

In a class of this embodiment, the current balance of DFS is calculated as follows:

$$Balance = \frac{\upsilon}{\sqrt{\left\{\frac{1}{m}\sum_{i=1}^{m}\left(\frac{R_c(i,r)}{R_t(i,r)}-\upsilon\right)^2\right\}}}.$$

In a class of this embodiment, in 4.6), the optimal adjustment factor $\alpha$ of the directory is obtained as follows: obtaining the IOPS of each directory in the updated directory migration queue, obtaining a first directory in the updated directory migration queue, and fitting multiple peer directories for the first directory to yield an IOPS curve; obtaining a directory number corresponding to a maximum slope change in the IOPS curve; defining a total number of directories in a horizontal axis of the IOPS curve before the directory number as the optimal adjustment factor $\alpha$ for the directory; for all remaining directories in the updated directory migration queue, repeating the above operations until all directories have been processed.

In another aspect, the disclosure also provides a load-aware directory migration system in a distributed file system, comprising:

a first module, configured to receive a plurality of directory requests created by DFS clients, parse each of the plurality of directory requests, to obtain directory request information corresponding to the plurality of directory requests;

a second module, configured to input all of the directory request information corresponding to the plurality of directory requests obtained by the first module into a pre-trained machine learning model, to obtain directory labels corresponding to all directory requests;

a third module, configured to obtain a label corresponding to a maximum score interval from the directory labels corresponding to all directory requests obtained by the second module, and to obtain all directories in the directory request information corresponding to the label;

a fourth module, configured to build a directory migration queue based on all the directories obtained by the third module; and a fifth module, configured to migrate all the directories in the directory migration queue obtained by the fourth module through particle swarm optimization (PSO).

The following advantages are associated with the load-aware directory migration method and system in a distributed file system (DFS) of the disclosure:

1. Through operations 1) to 5), the disclosure adopts a directory migration strategy. From a directory level perspective, the data migration does not require the maintenance costs of excessive file pointers. Therefore, the disclosure can solve the technical problem that the existing three file-level data migration methods, which introduce too many pointers during the migration process, require additional overheads to maintain these pointers.

2. Through operations 1) to 5), the disclosure makes full use of the persistent and stable characteristics of directory hotness, thus solving the technical problems of ineffective migration in the frequent file-level migration operations due to the rapid disappearance of the file hotness during the migration process in the existing three file-level data migration methods.

3. Through operations 2.1) to 2.8), the disclosure utilizes machine learning models to discover hot directories and determine the data that needs to be migrated the most. Therefore, the disclosure can solve the technical problem of low migration efficiency caused by the insufficient discovery of hotspot data in the existing three file-level data migration methods.

4. Through operations 4.1) to 4.9), the disclosure utilizes the peer directories to perform collaborative migration, thus exploiting data locality as much as possible in order to speed up IO access.

5. The disclosure uses machine learning models to analyze load information and discover hot directories in advance, propose a new transfer overhead analysis model to evaluate the necessity and urgency of migration data, and determine the timing of directory migration. To better utilize directory locality, the disclosure designs a collaborative migration mechanism for peer directories. In addition, a multi-objective optimization method is used to determine the target location of directory migration, improving the balance degree of the system.

BRIEF DESCRIPTION OF THE DRAWINGS

FIG. 2 is a flow chart of a load-aware directory migration method in a distributed file system (DFS) in accordance with one embodiment of the disclosure;

DETAILED DESCRIPTION

To further illustrate the disclosure, embodiments detailing a load-aware directory migration method and system in a distributed file system (DFS) are described below. It should be noted that the following embodiments are intended to describe and not to limit the disclosure.

The disclosure solves the load balancing problem of distributed file systems from the perspective of directories. Specifically, by analyzing load information through machine learning models to detect hotspots in advance, and comprehensively predicting directory hotness and system node status, the disclosure provides a migration overhead analysis model to measure the necessity and urgency of migration data, determine when to trigger migration or tolerate uneven situations. Combining the locality of the peer directories, the disclosure also designs a collaborative migration mechanism for the peer directories, and adopts a multi-objective optimization method to appropriately select the storage node to be migrated into, thereby improving the balance degree of the system.

In the experiment of the disclosure, it was found through testing on the livemap dataset that, after the directory was migrated to the selected storage node, the balance of the system was improved. The reason for this is that as the system runs, the nodes gradually lose balance. By predicting the hotspot directory on the node and considering the peer directories comprehensively, the hotspot directory is migrated to other nodes in advance, improving the balance degree and resource utilization of the entire system.

Figure 1:
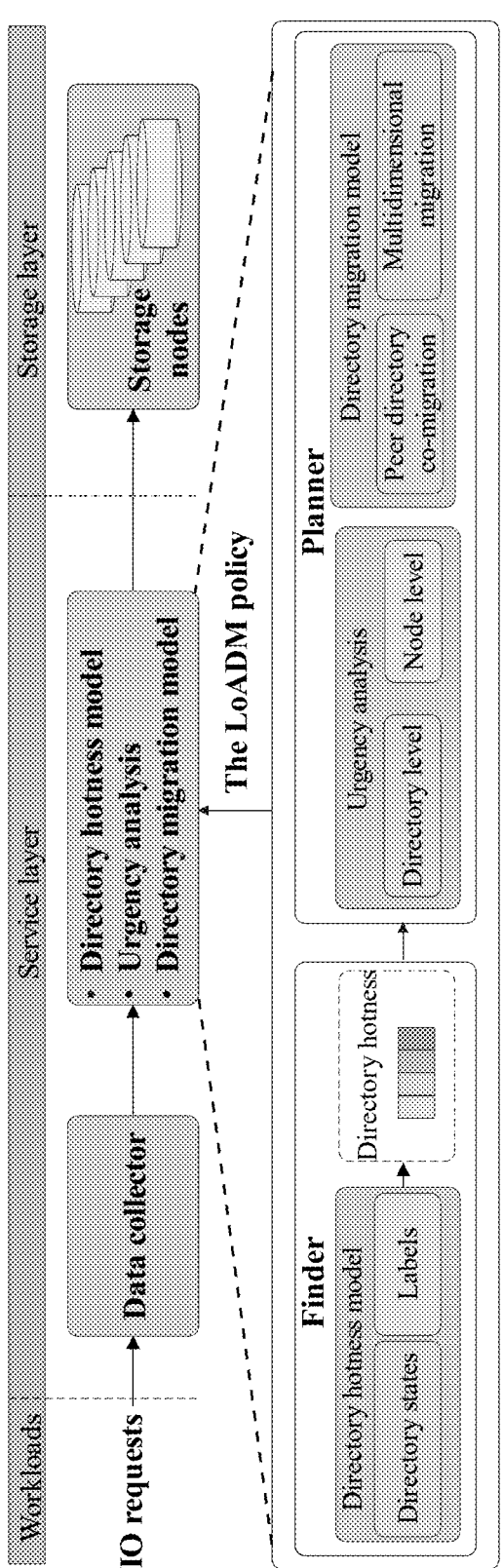
FIG. 1 is a block diagram of a load-aware directory migration method in a distributed file system (DFS) in accordance with one embodiment of the disclosure.

As shown in FIGS. 1 and 2, the disclosure provides a load-aware directory migration method in a distributed file system (DFS), the DFS comprising multiple storage node and DFS clients, the method being applied to the storage node, and comprising:

1) Receiving a plurality of directory requests created by DFS clients, parsing each of the plurality of directory requests, to obtain directory request information corresponding to the plurality of directory requests.

Specifically, parsing each of the plurality of directory requests to obtain directory request information corresponding to the plurality of directory requests comprises: obtaining a first historical information dataset comprising I/O history records during DFS runtime based on the directory requests, preprocessing the first historical information dataset to remove features unrelated to the directory requests, to obtain a second historical information dataset that only contains features related to the directory requests; and parsing the second historical information dataset, to obtain the directory request information corresponding to the plurality of directory requests; the directory request information comprises directory depth, time label for creating the directory, file object of the directory, IO Time mean, parent directory breadth, and the average difference between time-Stamps of the same access.

The advantage of the step is to fully explore log information, providing sufficient preparation and foundation for migration strategies.

2) Inputting all of the directory request information corresponding to the plurality of directory requests obtained in 1) into a pre-trained machine learning model, to obtain directory labels corresponding to all directory requests.

The advantage of the step is to use machine learning models to discover potential high load directories.

Specifically, the machine learning model used in the step is a lightweight gradient boosting machine (LightGBM) model.

Specifically, the machine learning model is trained through the following steps:

2.1) collecting historical directory data for all storage nodes in DFS;

specifically, the historical directory data of an i-th storage node in DFS comprises a current value $R_c$ (i, r) of a resource dimension r at a current time of the i-th storage node in DFS and a maximum value $R_t$ (i, r) of the resource dimension r of the i-th storage node in DFS, where r represents one of two resource dimensions of input/output operations per second (IOPS) and bandwidth, i represents the i-th storage node in DFS, and i∈(1, a total number of storage nodes in DFS is m), υ represents an average resource utilization of all storage nodes in DFS, and $$\upsilon = \frac{1}{m}\sum\nolimits_{i=1}^{m}\frac{R_c(i, r)}{R_t(i, r)};$$

2.2) for the historical directory data of each storage node in DFS collected in 2.1), obtaining the directory request information corresponding to each directory;

2.3) for the historical directory data of each storage node in DFS collected in 2.1), processing the historical directory data to obtain directory status information corresponding to each directory;

specifically, an average IOPS and average bandwidth of each directory in the historical directory data of each storage node in DFS collected in 2.1) are calculated in sequence and used as the directory request information corresponding to the directory;

2.4) for the historical directory data of each storage node in DFS collected in 2.1), normalizing the directory request information corresponding to all directories obtained in 2.2) to obtain normalized directory request information corresponding to each storage node; dividing the directory request information corresponding to all storage nodes and normalized directories into a training set and a testing set in a ratio of 6:4;

2.5) for each directory request information in the training set obtained in 2.4), calculating a directory hotness score corresponding to the directory request information;

specifically, the directory hotness score corresponding to the directory request information is calculated as follows:

$$HotnessScore = \lambda \times F + \frac{1-\lambda}{\Delta T}, \lambda \in [0, 1];$$

λ refers to a learned factor; F refers to access frequency to the directory, and ΔT refers to a mean value of the time intervals between every two access in a time window;

2.6) obtaining minimum and maximum values of the directory hotness score corresponding to the directory request information in the training set obtained in 2.5), and dividing all directory hotness scores into K score intervals based on the maximum and minimum values, with each score interval corresponding to a label;

Specifically, in the step, K is from 0 to 4, preferably 4, which means that a total of 4 labels are obtained. The request information of each directory in the training set corresponds to K (K is preferably 4) labels based on the score interval of its corresponding directory hotness score.

When K=4, the score range is divided in a ratio of 2.5:2.5:4:1 to obtain a label group comprising four labels (hotness0, hotness1, hotness2, hotness3), where label hotness3 corresponds to the largest score interval.

The advantage of the above steps 2.5) and 2.6) is that the model is able to learn the access characteristics of the directory, thereby perceiving the hotspot directory.

2.7) Inputting K labels obtained in 2.6) and the directory request information corresponding to each directory in the historical directory data of each storage node in DFS obtained in 2.2) into the machine learning model for classification training, to obtain a preliminarily trained machine learning model.

Specifically, the classification model in the step uses the LightGBM algorithm for classification. The label obtained in 2.6) is used as the training label. During the training process, the default cross entropy loss function of the LightGBM algorithm is used for iterative training until the LightGBM model converges, resulting in a preliminarily trained machine learning model.

2.8) Testing the preliminarily trained machine learning model obtained in 2.7) with the testing set obtained in 2.4), to obtain a trained machine learning model.

3) Obtaining a label corresponding to a maximum score interval from the directory labels corresponding to all directory requests obtained in 2), and obtaining all directories in the directory request information corresponding to the label;

4) building a directory migration queue based on all the directories obtained in 3);

Specifically, the step comprises:

4.1) initializing a total capacity of directories included in the directory migration queue: Capacity=0;

4.2) determining whether the total capacity of the directory included in the directory migration queue is greater than or equal to a predetermined proportion of a storage node capacity in DFS; if so, ending step of 4.2), otherwise, proceeding to 4.3);

specifically, the predetermined proportion is from 5% to 15%, and preferably, 10%;

4.3) obtaining a current balance of DFS and determining if the current balance is greater than or equal to a preset threshold; if so, ending step of 4.3), otherwise, proceeding to 4.4);

specifically, the current balance of DFS is calculated as follows:

$$Balance = \frac{\upsilon}{\sqrt{\left\{\frac{1}{m}\sum\nolimits_{i=1}^{m}\left(\frac{R_c(i, r)}{R_t(i, r)} - \upsilon\right)^2\right\}}}$$

Figure 4:
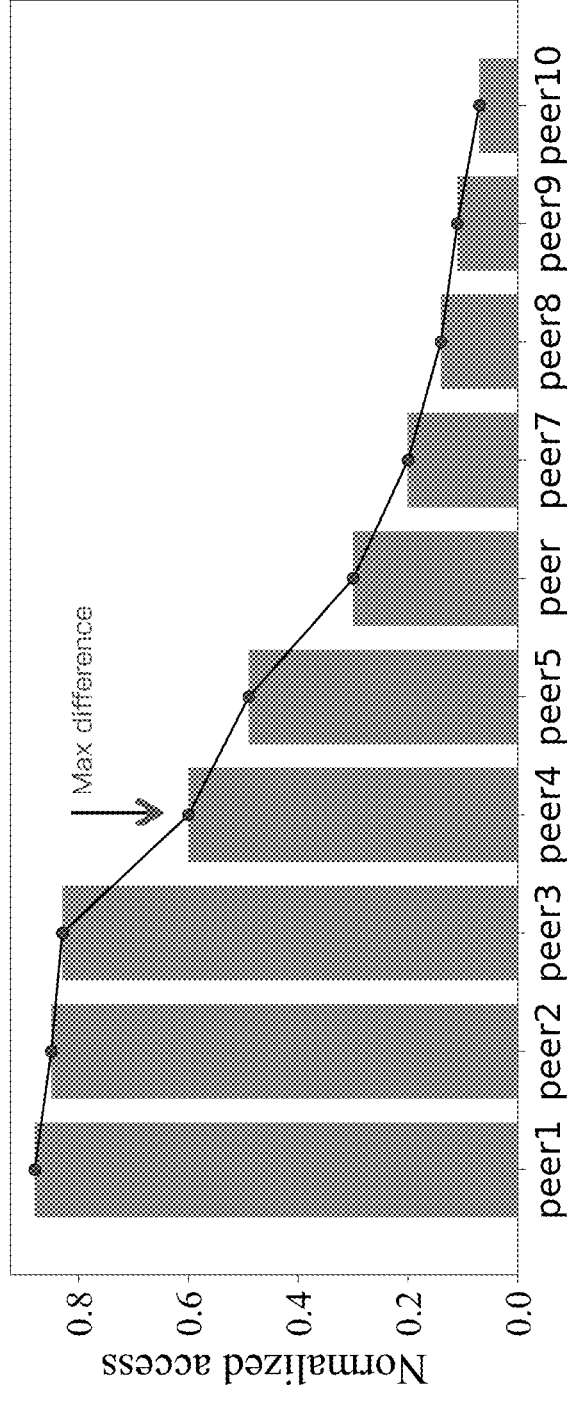
FIG. 4 is a schematic diagram of obtaining an optimal adjustment factor in step 4.6) of the method of the disclosure.

4.4) adding all the directories obtained in 3) to the directory migration queue which is initially empty to obtain an updated directory migration queue;

4.5) performing statistical analysis on the updated directory migration queue in 4.4) to obtain status information of each directory in peer directories in the updated directory migration queue;

specifically, the peer directories refer to the same node's subdirectories under the same parent directory (with the same depth);

4.6) for each directory in the updated directory migration queue obtained in 4.4), obtaining an optimal adjustment factor α of the directory based on the status information of the directory in the peer directories in the updated directory migration queue obtained in 4.5);

specifically, the optimal adjustment factor α of the directory is obtained as follows: obtaining the IOPS of each directory in the updated directory migration queue, obtaining a first directory in the updated directory migration queue, and fitting multiple peer directories for the first directory to yield an IOPS curve (the horizontal axis of the curve is the table of contents, and the vertical axis is IOPS, which are arranged in ascending order, as shown in FIG. 4); obtaining a directory number (it is 4 in FIG. 4) corresponding to the largest slope change (that is, inflection point) in the IOPS curve; defining a total number of directories in the horizontal axis of the IOPS curve before the directory number as the optimal adjustment factor α (it is 3 in FIG. 4) for the directory; for all remaining directories in the updated directory migration queue, repeating the above operations until all directories have been processed;

4.7) for each directory in the updated directory migration queue obtained in 4.4), selecting α peer directories of the directory based on the optimal adjustment factor α of the directory obtained in 4.6), and determining if there is a correlation between the α peer directories; if so, proceeding directly to 4.8), otherwise setting α=0 and proceeding to 4.8);

specifically, in FIG. 4, as α=3, the step is to obtain the three leftmost peer directories in the IOPS curve. If the access time of the three peer directories is within 5 minutes, it indicates that the three peer directories are related. Otherwise, it indicates that these three peer directories are not related.

4.8) For each directory in the updated directory migration queue obtained in 4.4), packaging the α peer directories of the directory into one object, and placing the object in the updated directory migration queue obtained in 4.4), to obtain a final directory migration queue;

the advantage of the steps 4.1)-4.8) is that during the migration process, the impact of peer directories is considered, and the locality of data is fully utilized to accelerate I/O access.

4.9) Calculating a current capacity CapacityDirj of the j-th directory in the final directory migration queue, where j∈(1, a total number of directories in the final directory migration queue is num), setting a total directory capacity contained in the final directory migration queue to Capacity=Capacity+Capacity_$Dir_1$+Capacity_$Dir_2$+ . . . +Capacity Dirnum, and returning to 4.2).

5) Migrating all the directories in the directory migration queue obtained in 4) through particle swarm optimization (PSO).

The advantage of the step is that the transfer problem is transformed into a multi-dimensional constraint solving problem, and particle swarm optimization algorithm is used to solve the problem, effectively ensuring the load balancing of the system.

In summary, by analyzing load information through machine learning models to detect hotspots in advance, and comprehensively predicting directory hotness and system node status, the disclosure provides a migration overhead analysis model to measure the necessity and urgency of migration data, determine when to trigger migration or tolerate uneven situations. Combining the locality of the peer directories, the disclosure also designs a collaborative migration mechanism for the peer directories, and adopts a multi-objective optimization method to appropriately select the storage node to be migrated into, thereby improving the balance degree of the system.

Experimental Results

Experimental environment of the disclosure: the CPU is a 6-core 3.2 GHz Intel Xeon i7-8700 (with a total of 12 threads), the frequency is 2133 MHZ, the memory is 32 GB DDR4 DRAM, with a 1T solid-state drive. The algorithm of the method of the disclosure is implemented using Python programming under the Linux operating system. The GlusterFS cluster system is used, with GlusterFS code version 8.2. The distributed cluster system comprises one GlusterFS client and four GlusterFS server storage nodes. The client and storage nodes are provided with Intel® Xeon® CPUs E5-2609@2.50 GHz Processor, 64 GB of memory and 2 TB of storage capacity, operating system CentOS 7.6. Storage nodes are interconnected through 1 GB Ethernet.

The parameter settings of particle swarm optimization algorithm are as follows: initial population size is 40, maximum iteration number is 400, inertia weight is 0.75, and acceleration constants are 2.8 and 1.3, respectively.

To verify the effectiveness and superiority of the method of the disclosure, relevant tests were conducted on the livemap dataset. The disclosure tests the balance of IOPS and bandwidth of the system after directory migration. The comparison schemes include schemes based on greed strategy, schemes based on file size, schemes based on file creation time, and schemes based on file popularity. In addition, difference of use and no-use of peer directory collaborative migration is also provided. FIG. 4 shows the test results.

Figure 3:
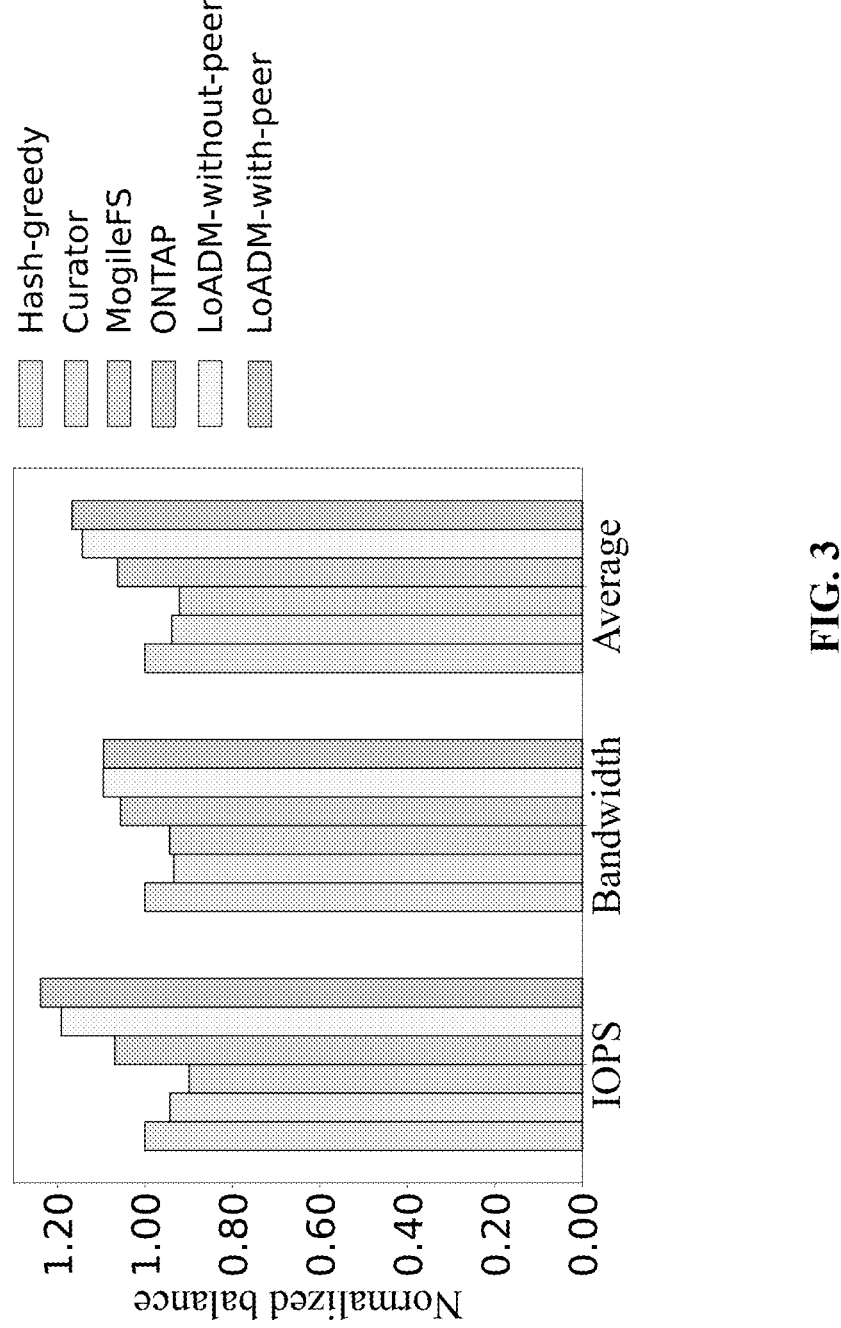
FIG. 3 shows results of the disclosure on the Livemap dataset.

According to the results in FIG. 3, the method of the disclosure can achieve the highest resource balance in bandwidth and IOPS based on the collaborative migration of the same-level directories. In addition, the disclosure also achieves similar improvements without collaborative migration of the same-level directories. Compared to other methods, the disclosure is in the lead in two different resource dimensions.

It will be obvious to those skilled in the art that changes and modifications may be made, and therefore, the aim in the appended claims is to cover all such changes and modifications.

What is claimed is:

1. A load-aware directory migration method in a distributed file system (DFS), the method comprising:

1) receiving a plurality of directory requests created by DFS clients, parsing each of the plurality of directory requests, to obtain directory request information corresponding to the plurality of directory requests;

2) inputting all of the directory request information corresponding to the plurality of directory requests obtained in 1) into a pre-trained machine learning model, to obtain directory labels corresponding to all directory requests;

3) obtaining a label corresponding to a maximum score interval from the directory labels corresponding to all directory requests obtained in 2), and obtaining all directories in the directory request information corresponding to the label;

4) Building a directory migration queue based on all the directories obtained in 3); and 5) Migrating all the directories in the directory migration queue obtained in 4) through particle swarm optimization (PSO);

wherein:

in 1), parsing each of the plurality of directory requests to obtain directory request information corresponding to the plurality of directory requests comprises: obtaining a first historical information dataset comprising I/O history records during DFS runtime based on the directory requests, preprocessing the first historical information dataset to remove features unrelated to the directory requests, to obtain a second historical information dataset that only contains features related to the directory requests; and parsing the second historical information dataset, to obtain the directory request information corresponding to the plurality of directory requests;

the machine learning model is a lightweight gradient boosting machine (LightGBM) model; and the machine learning model is trained through the following steps:

2.1) collecting historical directory data for all storage nodes in DFS;

2.2) for the historical directory data of each storage node in DFS collected in 2.1), obtaining the directory request information corresponding to each directory;

2.3) for the historical directory data of each storage node in DFS collected in 2.1), processing the historical directory data to obtain directory status information corresponding to each directory;

2.4) for the historical directory data of each storage node in DFS collected in 2.1), normalizing the directory request information corresponding to all directories obtained in 2.2) to obtain normalized directory request information corresponding to each storage node; dividing the directory request information corresponding to all storage nodes and normalized directories into a training set and a testing set in a ratio of 6:4;

2.5) for each directory request information in the training set obtained in 2.4), calculating a directory hotness score corresponding to the directory request information;

2.6) obtaining minimum and maximum values of the directory hotness score corresponding to the directory request information in the training set obtained in 2.5), and dividing all directory hotness scores into K score intervals based on the maximum and minimum values, with each score interval corresponding to a label;

2.7) inputting K labels obtained in 2.6) and the directory request information corresponding to each directory in the historical directory data of each storage node in DFS obtained in 2.2) into the machine learning model for classification training, to obtain a preliminarily trained machine learning model; and 2.8) testing the preliminarily trained machine learning model obtained in 2.7) with the testing set obtained in 2.4), to obtain a trained machine learning model.

2. The method of claim 1, wherein the historical directory data of an i-th storage node in DFS comprises a current value $R_c$ (i, r) of a resource dimension r at a current time of the i-th storage node in DFS and a maximum value $R_t$ (i, r) of the resource dimension r of the i-th storage node in DFS, where r represents one of two resource dimensions of input/output operations per second (IOPS) and bandwidth, i represents the i-th storage node in DFS, and i$\in$(1, a total number of storage nodes in DFS is m), $\upsilon$ represents an average resource utilization of all storage nodes in DFS, and $$\upsilon = \frac{1}{m}\sum\nolimits_{i=1}^{m} \frac{R_c(i, r)}{R_t(i, r)};$$

in 2.3), an average IOPS and average bandwidth of each directory in the historical directory data of each storage node in DFS collected in 2.1) are calculated in sequence and used as the directory request information corresponding to the directory.

3. The method of claim 2, wherein in 2.5), the directory hotness score corresponding to the directory request information is calculated as follows:

$$HotnessScore = \lambda \times F + \frac{1-\lambda}{\Delta T}, \lambda \in [0, 1];$$

$\lambda$ refers to a learned factor; F refers to access frequency to the directory, and $\Delta T$ refers to a mean value of the time intervals between every two access in a time window;

in 2.6), K is from 0 to 4, and each directory request information in the training set corresponds to K labels based on the score interval of the corresponding directory hotness score.

4. The method of claim 3, wherein in 4), building a directory migration queue based on all the directories comprises:

4.1) initializing a total capacity of directories included in the directory migration queue: Capacity=0;

4.2) determining whether the total capacity of the directory included in the directory migration queue is greater than or equal to a predetermined proportion of a storage node capacity in DFS; if so, ending step of 4.2), otherwise, proceeding to 4.3);

4.3) obtaining a current balance of DFS and determining if the current balance is greater than or equal to a preset threshold; if so, ending step of 4.3), otherwise, proceeding to 4.4);

4.4) adding all the directories obtained in 3) to the directory migration queue which is initially empty to obtain an updated directory migration queue;

4.5) performing statistical analysis on the updated directory migration queue in 4.4) to obtain status information of each directory in peer directories in the updated directory migration queue;

4.6) for each directory in the updated directory migration queue obtained in 4.4), obtaining an optimal adjustment factor $\alpha$ of the directory based on the status information of the directory in the peer directories in the updated directory migration queue obtained in 4.5);

4.7) for each directory in the updated directory migration queue obtained in 4.4), selecting $\alpha$ peer directories of the directory based on the optimal adjustment factor $\alpha$ of the directory obtained in 4.6), and determining if there is a correlation between the $\alpha$ peer directories; if so, proceeding directly to 4.8), otherwise setting $\alpha$=0 and proceeding to 4.8);

4.8) for each directory in the updated directory migration queue obtained in 4.4), packaging the $\alpha$ peer directories of the directory into one object, and placing the object in the updated directory migration queue obtained in 4.4), to obtain a final directory migration queue; and 4.9) calculating a current capacity CapacityDirj of a j-th directory in the final directory migration queue, where j$\in$(1, a total number of directories in the final directory migration queue is num), setting a total directory capacity contained in the final directory migration queue to Capacity=Capacity+Capacity_Dir$_1$+Capacity_Dir$_2$+ . . . +Capacity Dir$_{num}$, and returning to 4.2).

5. The method of claim 4, wherein the current balance of DFS is calculated as follows:

$$\text{Balance} = \frac{\upsilon}{\sqrt{\left\{\frac{1}{m}\sum_{i=1}^{m}\left(\frac{R_c(i,\,r)}{R_t(i,\,r)} - \upsilon\right)^2\right\}}}. \qquad 5$$

6. The method of claim 5, wherein in 4.6), the optimal adjustment factor $\alpha$ of the directory is obtained as follows: obtaining the IOPS of each directory in the updated directory migration queue, obtaining a first directory in the updated directory migration queue, and fitting multiple peer directories for the first directory to yield an IOPS curve; obtaining a directory number corresponding to a maximum slope change in the IOPS curve; defining a total number of directories in a horizontal axis of the IOPS curve before the directory number as the optimal adjustment factor $\alpha$ for the directory; for all remaining directories in the updated directory migration queue, repeating the above operations until all directories have been processed.

* * * * *